US012403972B2

(12) United States Patent
Darczuk et al.

(10) Patent No.: US 12,403,972 B2
(45) Date of Patent: **\*Sep. 2, 2025**

(54) VEHICLE HEADLIGHT

(71) Applicant: Harley-Davidson Motor Company, Inc., Milwaukee, WI (US)

(72) Inventors: Kevin G. Darczuk, Wauwatosa, WI (US); Michael C. Heit, Wauwatosa, WI (US); Robert J. Brummond, Sussex, WI (US); Anthony N. Avallone, Wauwatosa, WI (US)

(73) Assignee: Harley-Davidson Motor Company, Inc., Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/774,855

(22) Filed: Jul. 16, 2024

(65) Prior Publication Data

US 2024/0367741 A1 Nov. 7, 2024

Related U.S. Application Data

(63) Continuation of application No. 18/350,101, filed on Jul. 11, 2023, now Pat. No. 12,065,209.

(60) Provisional application No. 63/461,850, filed on Apr. 25, 2023.

(51) Int. Cl.
| | |
|---|---|
| *B62J 6/026* | (2020.01) |
| *B62J 6/024* | (2020.01) |
| *B62J 6/055* | (2020.01) |
| *F21S 45/33* | (2018.01) |
| *B62J 17/10* | (2020.01) |
| *F21W 102/13* | (2018.01) |
| *F21W 107/17* | (2018.01) |

(52) U.S. Cl.
CPC ............... *B62J 6/026* (2020.02); *B62J 6/024* (2020.02); *B62J 6/055* (2020.02); *F21S 45/33* (2018.01); *B62J 17/10* (2020.02); *F21W 2102/13* (2018.01); *F21W 2107/17* (2018.01)

(58) Field of Classification Search
CPC ...... F21W 2107/17; F21S 43/00; B62J 6/026; B62J 17/10
See application file for complete search history.

(56) References Cited

U.S. PATENT DOCUMENTS

| | | |
|---|---|---|
| 7,484,869 B2 | 2/2009 | Kogo et al. |
| D617,020 S | 6/2010 | Ishiguri et al. |
| D732,214 S | 6/2015 | Ishiguri et al. |
| D739,792 S | 9/2015 | Ishiguri et al. |
| D741,524 S | 10/2015 | Ohashi et al. |

(Continued)

FOREIGN PATENT DOCUMENTS

| | | | | |
|---|---|---|---|---|
| WO | WO-2018074147 A1 | * | 4/2018 | ............ B62J 6/024 |
| WO | 2018180354 A1 | | 10/2018 | |

*Primary Examiner* — Robert J May
(74) *Attorney, Agent, or Firm* — Michael Best & Friedrich LLP (57) ABSTRACT

A vehicle headlight includes a housing and a central area within the housing configured to emit high beam illumination from a high beam light source and configured to emit low beam illumination from a low beam light source. A pair of flow-through vents open to a front side of the housing and open to a rear side of the housing. A pair of outboard areas within the housing include supplementary light sources. The pair of outboard areas are positioned outboard of the pair of flow-through vents of the vehicle headlight.

20 Claims, 6 Drawing Sheets

(56) References Cited

U.S. PATENT DOCUMENTS

| | | | |
|---|---|---|---|
| D759,276 S | 6/2016 | Kuriki et al. | |
| 9,593,817 B2 | 3/2017 | Kuriki | |
| 9,695,999 B2 | 7/2017 | Takenaka et al. | |
| 9,815,503 B2 | 11/2017 | Tsukui | |
| 9,963,182 B2 | 5/2018 | Oguchi | |
| D850,985 S | 6/2019 | Tsuji | |
| 10,442,487 B2 | 10/2019 | Tsuchiya | |
| 10,801,686 B2 | 10/2020 | Kizaki | |
| 10,821,884 B1 | 11/2020 | Johnson et al. | |
| 2012/0236583 A1 | 9/2012 | Ochiai et al. | |
| 2022/0204104 A1* | 6/2022 | Imazeki | B62J 40/10 |

* cited by examiner

VEHICLE HEADLIGHT

CROSS-REFERENCE TO RELATED APPLICATIONS

This application claims priority to co-pending U.S. patent application Ser. No. 18/350,101, filed on Jul. 11, 2023, which claims priority to U.S. Provisional Patent Application No. 63/461,850, filed on Apr. 25, 2023, the entire contents of each of which are incorporated by reference herein.

BACKGROUND

Modern vehicles, including motorcycles, may include numerous forward lighting functions, which can be provided separately from each other in many instances. In other cases, an integrated headlight unit is provided incorporating a plurality of lighting functions.

SUMMARY

In one aspect, the present disclosure provides a vehicle headlight including a housing and a central area within the housing configured to emit high beam illumination from a high beam light source and configured to emit low beam illumination from a low beam light source. A pair of flow-through vents open to a front side of the housing and open to a rear side of the housing. A pair of outboard areas within the housing include supplementary light sources. The pair of outboard areas are positioned outboard of the pair of flow-through vents of the vehicle headlight.

In another aspect, the present disclosure provides a vehicle headlight including a high beam light and a low beam light. The vehicle headlight also includes a position light separate from the high beam and low beam lights. The vehicle headlight also includes a left turn signal light, and a right turn signal light. The position light includes a first portion configured to flash with the left turn signal light. The position light includes a second portion configured to flash with the right turn signal light.

In another aspect, the present disclosure provides a vehicle headlight including: a housing; a central area within the housing including a high beam light source configured to emit high beam illumination and a low beam light source configured to emit low beam illumination; a position light separate from the high beam illumination and the low beam illumination, the position light including a central portion that extends along a portion of a perimeter of the central area, a first outboard portion continuous with the central portion, and a second outboard portion continuous with the central portion, and a pair of flow-through vents extending through the housing between a front side of the housing and a rear side of the housing; and wherein the first outboard portion and the second outboard portion are positioned outboard of the pair of flow-through vents of the vehicle headlight.

In another aspect, the present disclosure provides a vehicle headlight including: a housing; a high beam light supported by the housing; a low beam light supported by the housing; and a position light supported by the housing, the position light being separate from the high beam light and low beam light, the position light including a central portion connecting a first outboard portion and second outboard portion, wherein the first outboard portion and the second outboard portion are positioned on opposite sides of both the high beam light and the low beam light, wherein each of the first outboard portion and second outboard portion is configured to illuminate separately from the central portion.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

Figure 1:
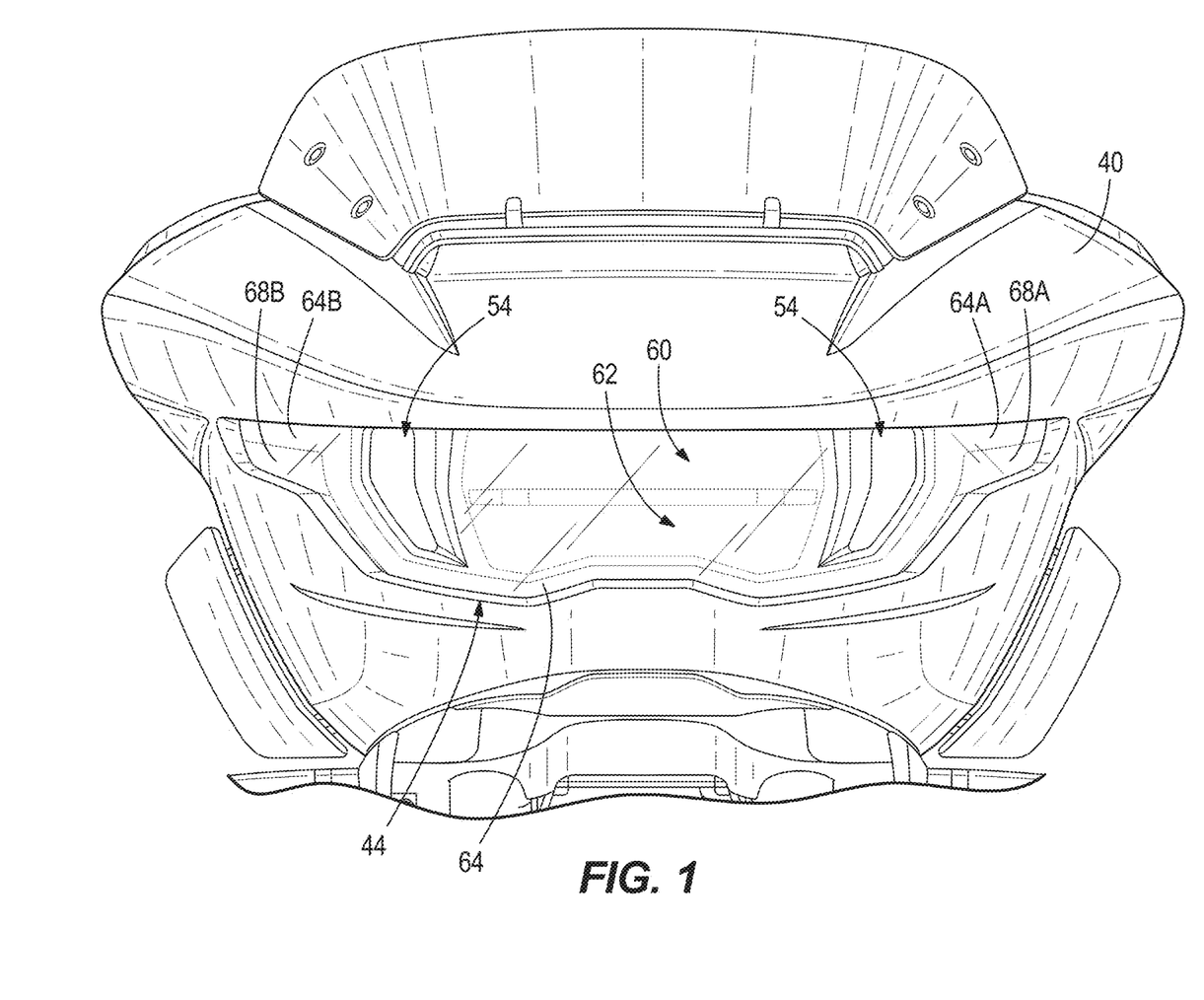
FIG. 1 is a front view of a vehicle headlight according to one embodiment of the present disclosure.
Figure 8:
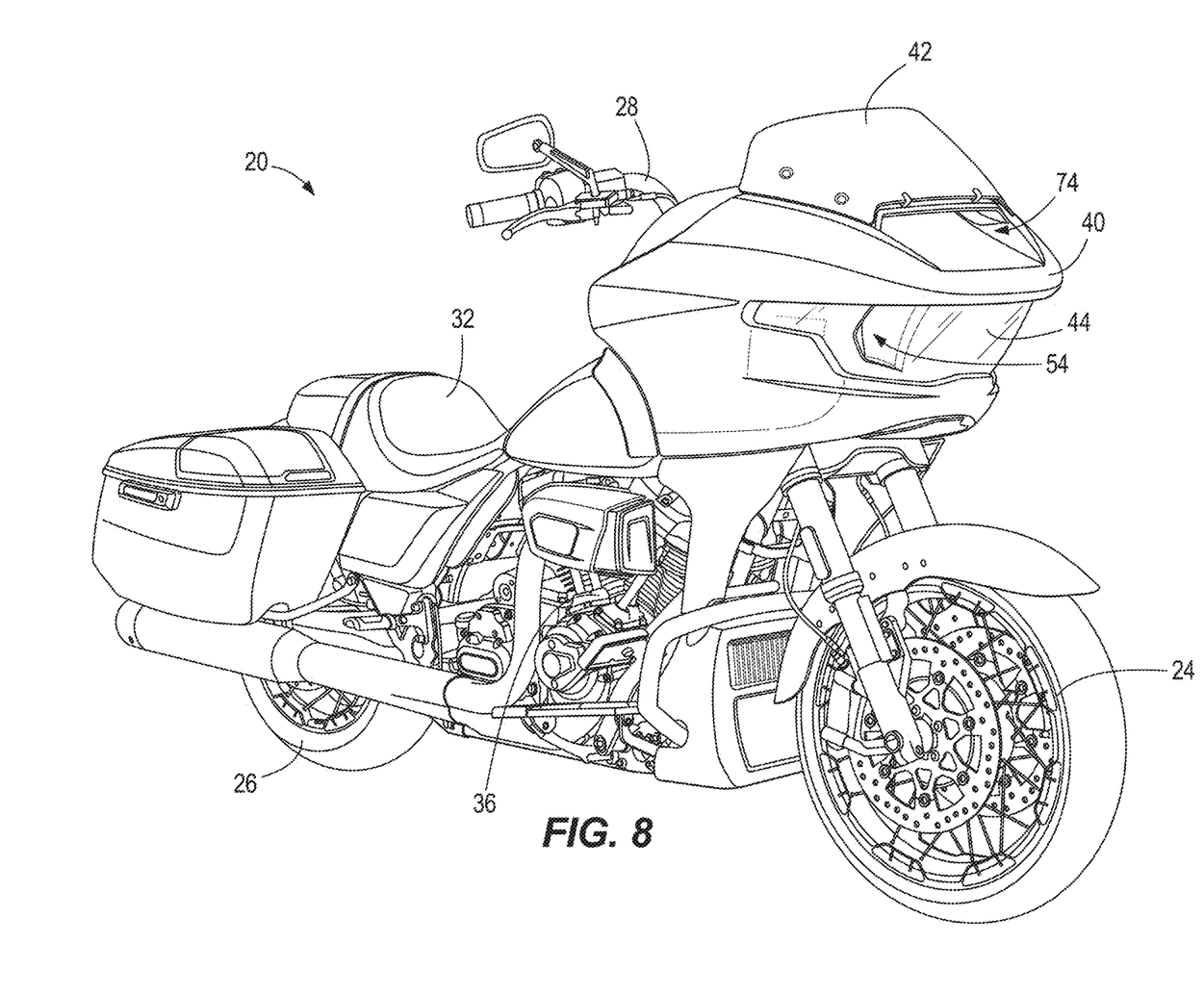
FIG. 8 is a perspective view of a motorcycle having the headlight of the preceding figures.

FIG. 1 illustrates a front end of a motorcycle 20 according to one construction. The motorcycle 20, shown in its entirety in FIG. 8, is configured for operation by a straddling rider (not shown). The motorcycle 20 is a leaning single-track vehicle including a single front wheel 24 and a single rear wheel 26 in some constructions. However, other vehicle configurations are optional, including but not limited to trikes. The front wheel 24 is movable for directional control by the rider through manipulation of a handlebar 28. A saddle seat 32 is provided for supporting the rider in an open cockpit in position for operating the motorcycle 20. The rear wheel 26 is driven by the motorcycle's power unit 36, which can be internal combustion, electric, a combination thereof, or operated with another alternative energy source. According to the illustrated construction, the motorcycle 20 is a touring motorcycle or so-called "heavyweight" motorcycle configured for long-distance touring. The motorcycle 20 includes a front fairing 40 supporting at a top end thereof a windshield 42. A headlight unit 44 (or "headlight") is integrated into the front fairing 40 to provide multi-function front lighting as described in further detail below. The motorcycle 20 including the headlight 44 as shown represents just one possible embodiment of a vehicle in which features described below may be incorporated.

Figure 5:
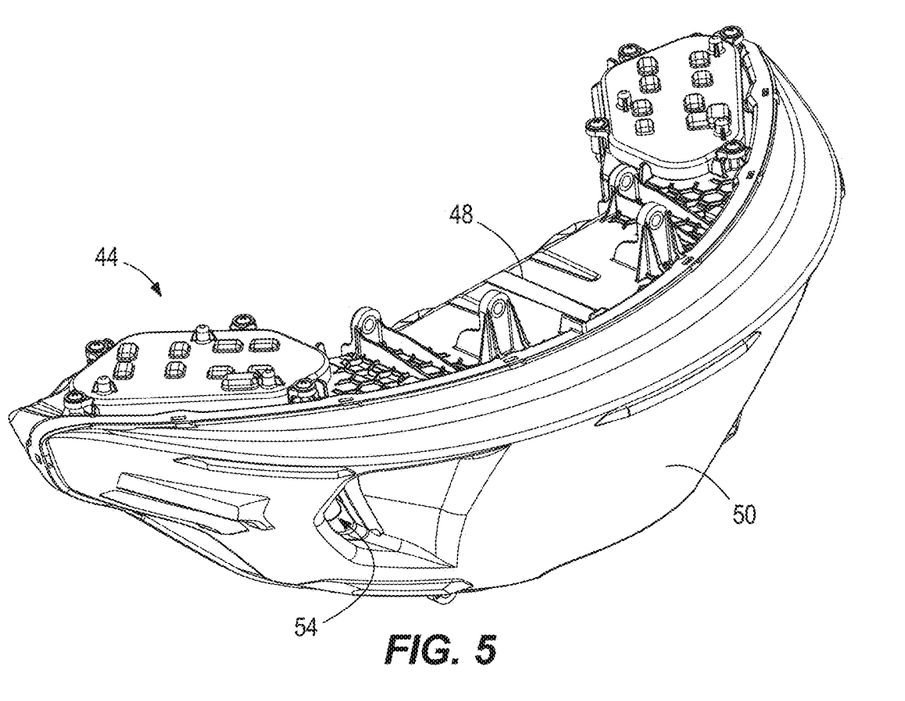
FIG. 5 is a perspective view of the vehicle headlight of FIG. 1, removed from a motorcycle fairing.
Figure 6:
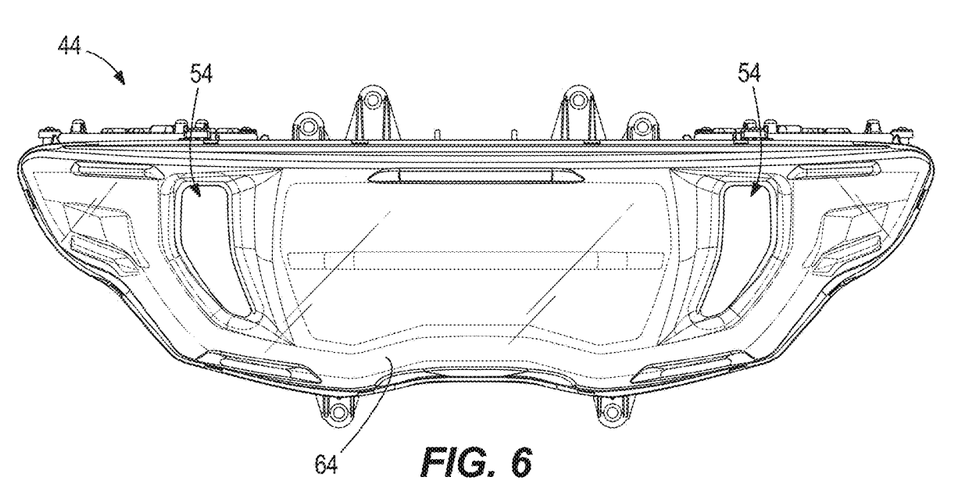
FIG. 6 is a front view of the vehicle headlight of FIG. 1.

The headlight 44 can be constructed as a single integrated unit having a main housing 48 (FIG. 5). Also shown in FIG. 5, the headlight 44 can include a single continuous lens 50 spanning a width of the headlight 44 at a front end of the housing 48. The headlight 44 has an outer profile in front view (FIG. 1) that fits into a complementary opening in the front of the fairing 40. The headlight 44 can define a forward illumination direction, although the headlight 44 may extend or wrap around a contour of the fairing 40 to sweep rearwardly and provide some side exposure. One or more vent passages 54 can be defined within and through the headlight 44. In particular, the headlight 44 includes two vent passages 54 flanking a central portion of the headlight 44 that provides the high beam and low beam functions. The vent passages 54 can have forward openings formed in the headlight lens 50. Rear openings of the vent passages 54 can be provided in the main housing 48 and can be directed, directly or indirectly, toward the rider seated in the cockpit behind the fairing 40. By configuring the headlight 44 with the vent passages 54, air can flow through the headlight 44 during forward travel of the motorcycle 20, adding to rider comfort through cooling airflow and/or reduction of buffeting to the rider's head. In particular, the vent passages 54 enable laminar airflow to be ingested into the vent without flow separation near the vent inlet. Flow remains attached within each vent passage 54, with minimal cross-sectional area changes and disruptions at the walls to prevent internal flow separation and minimize propensity for flow induced whistles. In some constructions, the cross-sectional area remains substantially constant through the vent passage 54 from the inlet to the outlet. Whether the cross-sectional area remains constant or changes, the walls defining each vent passage 54 remain substantially smooth, avoiding abrupt changes in size and/or shape. Flow of air through the vent passages 54 works in cooperation with the windshield vent 74 shown in FIG. 8 to reduce turbulence and increase rider thermal comfort.

As shown in FIG. 1, where the headlight 44 is off (nothing illuminated), the center section of the headlight 44 includes a low beam light source 60 (or "low beam light") and a high beam light source 62 (or "high beam light"). Separate from the low beam light source 60 and the high beam light source 62, the headlight 44 includes a position light source 64 (or "position light"). It will be understood that each one of the low beam light 60, the high beam light 62, and the position light 64 can be embodied with one or more individual lighting elements (e.g., bulbs, diodes, etc.). Additional devices, such as reflectors, light guides, etc. can also be incorporated to provide the desired lighting effect. The position light 64 is provided as a running light to enhance visibility of the motorcycle 20 to others, rather than for the purpose of forward path illumination for the rider. The position light 64 can take a shape of a thin outline that follows a portion of the outer perimeter of the headlight 44. As shown, the position light 64 extends along a bottom edge of the headlight 44, below the low beam light 60 and the high beam light 62. The position light 64 continues outboard, under the vent passages 54, before turning upward along an outer portion of each of the vent passages 54. Along the vent passages 54, the position light 64 extends from a bottom edge of the headlight 44 to a top edge thereof. The position light 64 includes outboard portions 64A, 64B that extend away from the central headlight portion and away from the respective vent passages 54. The outboard portions 64A, 64B of the position light 64 extend (e.g., substantially horizontally) to the widthwise ends of the headlight 44. The position light 64 can extend continuously across the headlight 44 as shown (e.g., configured to provide one continuous illuminated strip), or may alternately be subdivided.

Additionally, within the outboard areas of the headlight 44, dedicated turn signal light sources 68A, 68B (or "turn signal lights") are provided.

Figure 7:
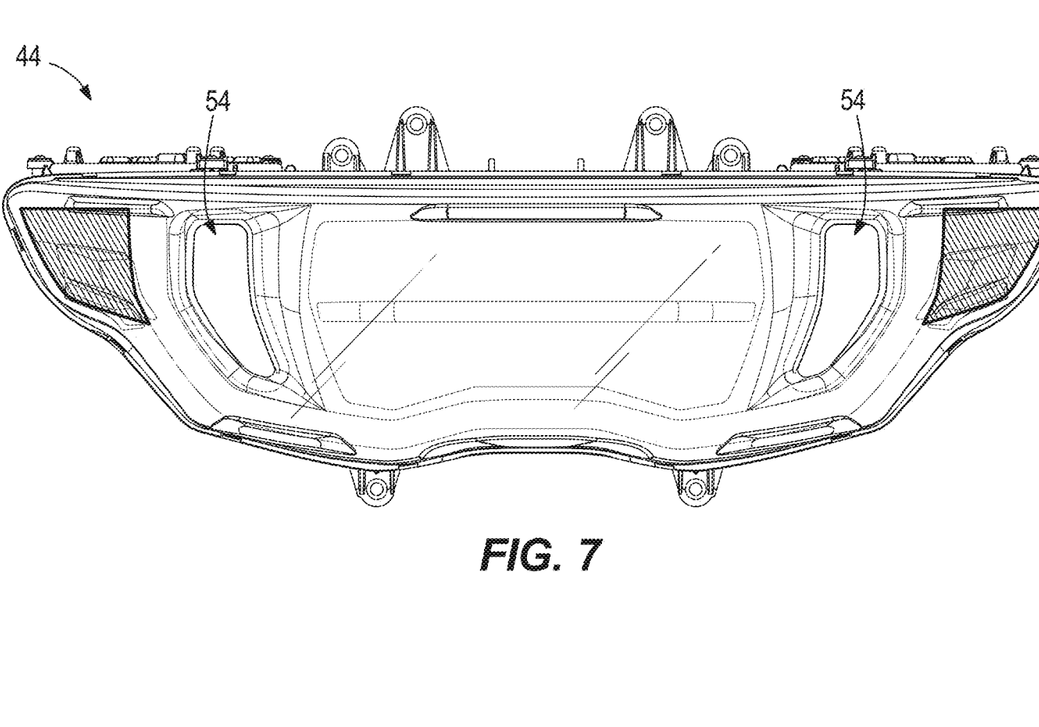
FIG. 7 is a front view of the vehicle headlight of FIG. 1, with cross-hatching indicating the turn signal illumination areas.

The dedicated turn signal lights 68A, 68B can be positioned in close proximity to the outboard portions 64A, 64B of the position light 64. For example, the dedicated turn signal lights 68A, 68B can be positioned directly adjacent the respective outboard portions 64A, 64B of the position light 64. As shown, this can include the dedicated turn signal lights 68A, 68B being positioned directly below the outboard portions 64A, 64B of the position light 64. The dedicated turn signal lights 68A, 68B and the outboard portions 64A, 64B of the position light 64 can have matching widths. In other constructions, the dedicated turn signal lights 68A, 68B can be positioned above or next to the outboard portions 64A, 64B of the position light 64. In some constructions, the dedicated turn signal lights 68A, 68B may wrap around the outboard portions 64A, 64B of the position light 64. Each dedicated turn signal light 68A, 68B can be configured to provide coextensive illumination with the respective outboard portion 64A, 64B of the position light 64 such that the effect during use is that of one light of the larger area defined by both lights together (i.e., left outboard portion 64A and left turn signal light 68A together, or right outboard portion 64B and right turn signal light 68B together). This is schematically illustrated in FIG. 7 where the total illuminated area for both the left and right turn signals is shown by the two cross-hatched areas.

Figure 2:
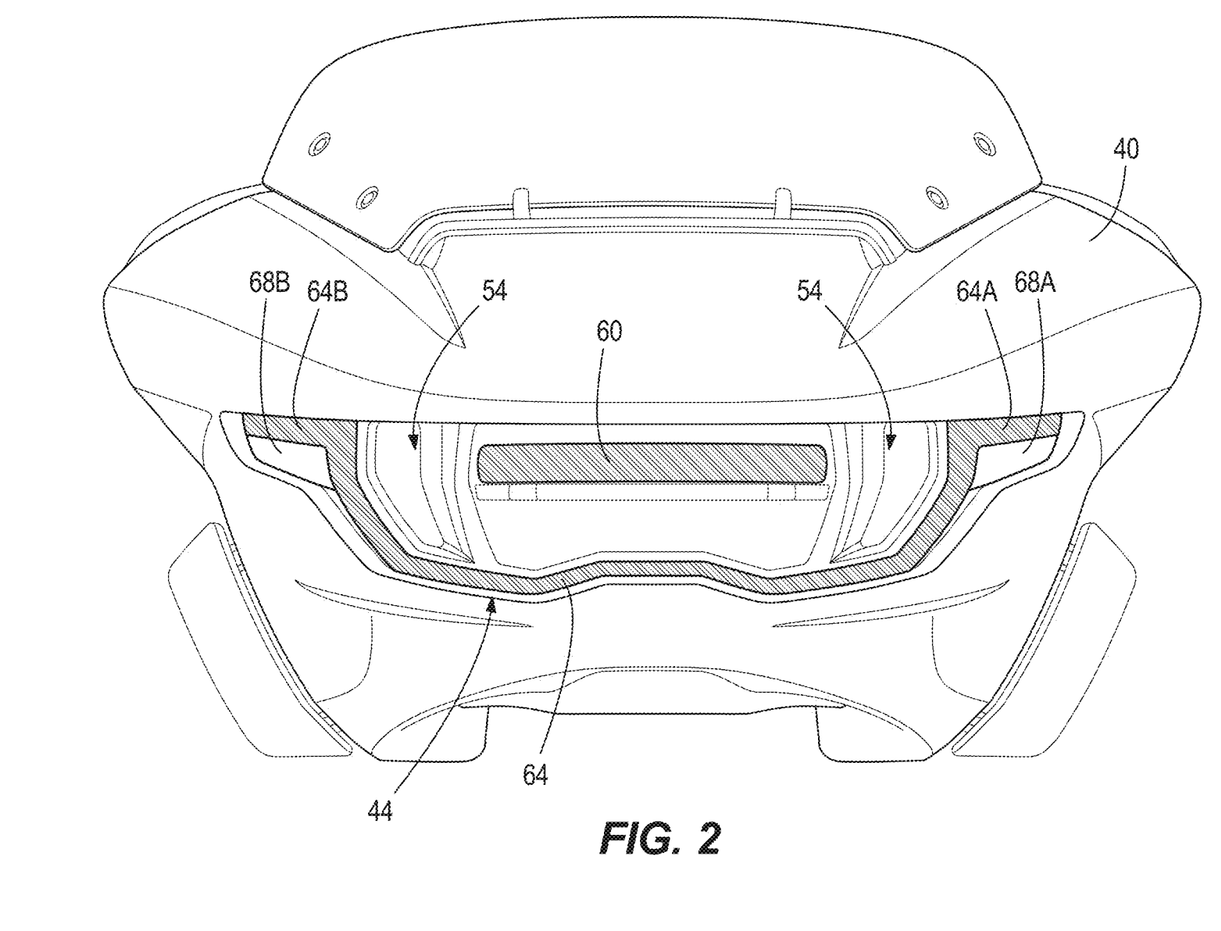
FIG. 2 is a front view of the vehicle headlight of FIG. 1 in a first illuminated configuration, including a headlight low beam and a position light, as indicated by cross-hatching.
Figure 3:
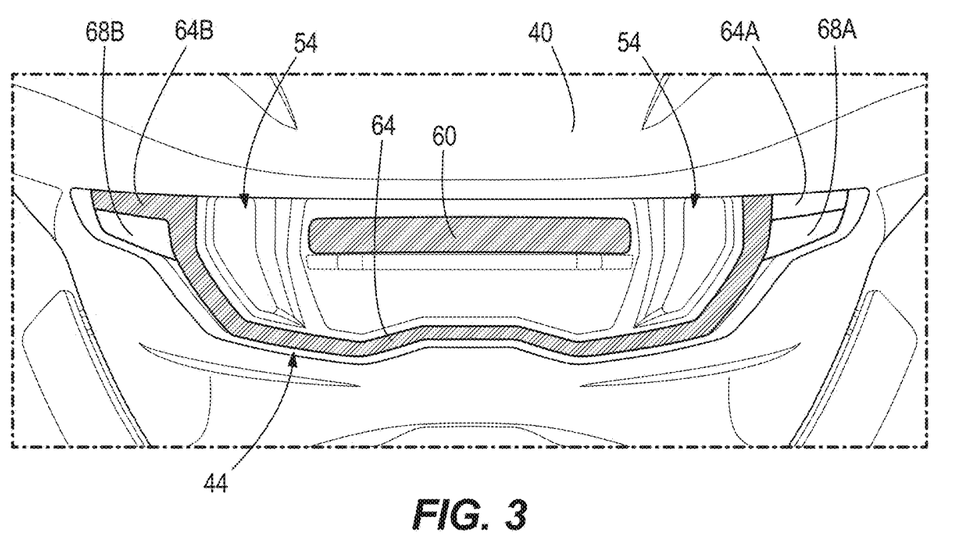
FIG. 3 is a front view of the vehicle headlight of FIG. 1 in a second illuminated configuration in which a portion of the position light flashes off during use as a turn signal. The headlight low beam and the remainder of the position light are indicated by cross-hatching as in FIG. 2.
Figure 4:
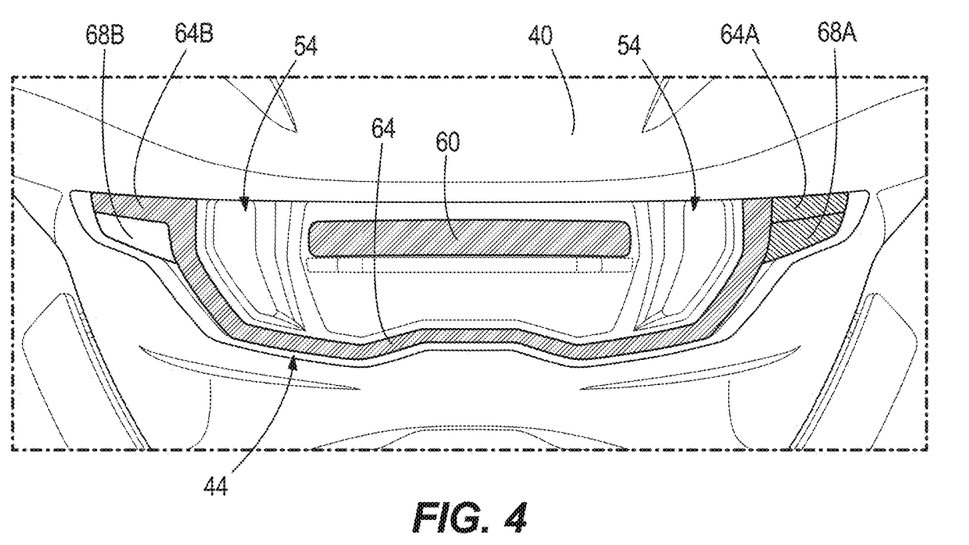
FIG. 4 is a front view of the vehicle headlight of FIG. 1 in a third illuminated configuration in which the portion of the position light flashes on during use as a turn signal. An additional turn signal light flashes with the turn signal portion of the position light, as indicated by the cross-hatching.

FIG. 2 is a front view of the vehicle headlight of FIG. 1 in a first illuminated configuration in which the low beam light 60 of the headlight 44 is illuminated, along with the position light 64 (in its entirety). The illumination areas of the low beam light 60 and the position light 64 are indicated by cross-hatching. The turn signal lights 68A, 68B are off. FIGS. 3 and 4 illustrate the two illuminated configurations of the headlight 44 that alternate upon actuation of the left turn signal of the motorcycle 20. In FIG. 3, the left dedicated turn signal light 68A is off, and the left outboard portion 64A of the position light 64 is also off. The remainder of the position light 64 remains on, as indicated by the cross-hatching. In FIG. 4, the left dedicated turn signal light 68A is on, and the left outboard portion 64A of the position light 64 is also on, as indicated by the cross-hatching. The color of both the left dedicated turn signal light 68A and the left outboard portion 64A of the position light 64 may be different (e.g., amber) than the color of the regular illumination of the position light 64 (e.g., white). This is indicated schematically by the different cross-hatch patterns. The headlight 44 alternates between the illuminated configurations of FIGS. 3 and 4 (i.e., flashing) in order to provide the left turn signal function. Although not shown, the same configurations are used for the right dedicated turn signal light 68B and the right outboard portion 64B of the position light 64 for the right turn signal function. Although the low beam light 60 is illuminated in FIGS. 2-4, the position light 64 can partially convert to a turn signal as shown in FIGS. 3 and 4, regardless of the status, function, or placement of the other portions of the headlight, including for example the low beam light 60 and the high beam light 62. Although the description above, along with FIGS. 3 and 4, refers to the position light 64 remaining illuminated (in the central portion between the outboard portions 64A, 64B) during turn signal flashing operation, it is also conceived that the position light 64 may be configured to remain off during turn signal operation, with the exception of flashing the selected one of the outboard portions 64A, 64B.

Lighting modes or configurations of the headlight 44, including the alternate flashing of one of the position light outboard portions 64A, 64B (e.g., which may be flashed together with the corresponding one of the dedicated turn signals 68A, 68B) as described above can be controlled by an electronic controller. The controller may store and/or execute a program with instructions for one or more functions of the headlight 44. Such a controller can be a vehicle controller incorporating multiple other functions of the vehicle besides lighting. For example, the controller can be a main electronic control module (ECM) of the vehicle. In other constructions, the controller is a local controller located on, in, or adjacent the headlight 44 (e.g., secured to the main housing 48). In some constructions, the controller, whether secured to the headlight 44 or spaced therefrom, is situated within the fairing 40.

As will be appreciated from the drawings, the outboard portions 64A, 64B of the position light that function selectively as turn signals are positioned at the outboard ends of the position light 64. The outboard portions 64A, 64B are also formed to have a distinct shape and/or direction that diverges from that of the remainder of the position light 64. It should be understood that the outboard portions 64A, 64B are thus easily identifiable and offset from the center to give a clear directional indication. In other constructions, the outboard portions 64A, 64B can be larger or smaller than shown. The position light 64 may be formed with additional outboard portions, which may or may not also function as turn signals. In some constructions, the outboard portions 64A, 64B of the position light 64 may be under a government-mandated size for turn signals, necessitating the additional dedicated turn signals 68A, 68B. In other constructions, the outboard portions 64A, 64B alone may be large enough to meet government mandated size for turn signals. In such instances, the headlight 44 may be provided without the dedicated turn signals 68A, 68B.

Various aspects of the invention are set forth in the following claims.

What is claimed is:

1. A vehicle headlight comprising:
    a housing;
    a central area within the housing including a high beam light source configured to emit high beam illumination and a low beam light source configured to emit low beam illumination;
    a position light separate from the high beam illumination and the low beam illumination, the position light including a central portion that extends along a portion of a perimeter of the central area, a first outboard portion continuous with the central portion, and a second outboard portion continuous with the central portion, and
    a pair of flow-through vents extending through the housing between a front side of the housing and a rear side of the housing; and
    wherein the first outboard portion and the second outboard portion are positioned outboard of the pair of flow-through vents of the vehicle headlight.

2. The vehicle headlight of claim 1, wherein the central portion extends along a bottom edge of the housing and transitions towards a top edge of the housing on opposite sides of the central area.

3. The vehicle headlight of claim 2, wherein the first outboard portion extends away from the central portion in a first direction and the second outboard portion extends away from the central portion in a second, different direction, each of the first outboard portion and the second outboard portion extending along the top edge.

4. The vehicle headlight of claim 2, wherein the central portion extends along outboard edges of respective ones of the pair of flow-through vents.

5. The vehicle headlight of claim 4, wherein the first outboard portion and the second outboard portion are horizontally elongated in a direction away from the respective ones of the pair of flow-through vents.

6. The vehicle headlight of claim 1, wherein one of the pair of flow-through vents is between the central area and the first outboard portion and the other of the pair of flow-through vents is between the central area and the second outboard portion.

7. The vehicle headlight of claim 1, further comprising a pair of supplementary light sources positioned outboard of respective ones of the pair of flow-through vents.

8. The vehicle headlight of claim 7, wherein the pair of supplementary light sources are dedicated turn signals configured to flash to provide a turn signal function.

9. The vehicle headlight of claim 8, wherein the central portion of the position light is positioned between the dedicated turn signals and between respective outboard sides of the pair of flow-through vents.

10. The vehicle headlight of claim 9, wherein each of the first outboard portion and the second outboard portion of the position light is directly above a respective one of the dedicated turn signals to provide a continuous turn signal illumination area.

11. The vehicle headlight of claim 8, wherein each of the first outboard portion and the second outboard portion of the position light is directly adjacent a respective one of the dedicated turn signals to provide a continuous turn signal illumination area.

12. The vehicle headlight of claim 1, further comprising a single continuous lens spanning the high beam light source, the low beam light source, and the position light, wherein openings to the pair of flow-through vents are formed in the lens.

13. A vehicle headlight comprising:
    a housing;
    a high beam light supported by the housing;
    a low beam light supported by the housing; and
    a position light supported by the housing, the position light being separate from the high beam light and low beam light, the position light including a central portion connecting a first outboard portion and second outboard portion, wherein the first outboard portion and the second outboard portion are positioned on opposite sides of both the high beam light and the low beam light,
    wherein each of the first outboard portion and second outboard portion is configured to illuminate separately from the central portion.

14. The vehicle headlight of claim 13, wherein the central portion extends along a bottom edge of the housing and transitions towards a top edge of the housing on opposite sides of both the high beam light and the low beam light.

15. The vehicle headlight of claim 14, wherein the first outboard portion extends away from the central portion in a first direction and the second outboard portion extends away from the central portion in a second, different direction, each of the first outboard portion and the second outboard portion extending along the top edge.

16. The vehicle headlight of claim 13, further comprising a left turn signal light supported by the housing outboard of both the high beam light and the low beam light and a right turn signal light supported by the housing outboard of both the high beam light and the low beam light.

17. The vehicle headlight of claim 16, wherein the left turn signal light is positioned adjacent the first outboard portion and the right turn signal light is positioned adjacent the second outboard portion.

18. The vehicle headlight of claim 16, wherein the left turn signal light is positioned above the first outboard portion and the right turn signal light is positioned above the second outboard portion.

19. The vehicle headlight of claim 16, further comprising a single continuous lens supported by the housing and covering the high beam light, the low beam light, the position light, and the left and right turn signal lights.

20. The vehicle headlight of claim 13, further comprising a single continuous lens supported by the housing and covering the high beam light, the low beam light, and the position light.

\* \* \* \* \*